G. I. ANDERSEN.
DEVICE FOR DENOTING EXPANSION OF DOUGH.
APPLICATION FILED FEB. 15, 1911.
1,037,714.
Patented Sept. 3, 1912.
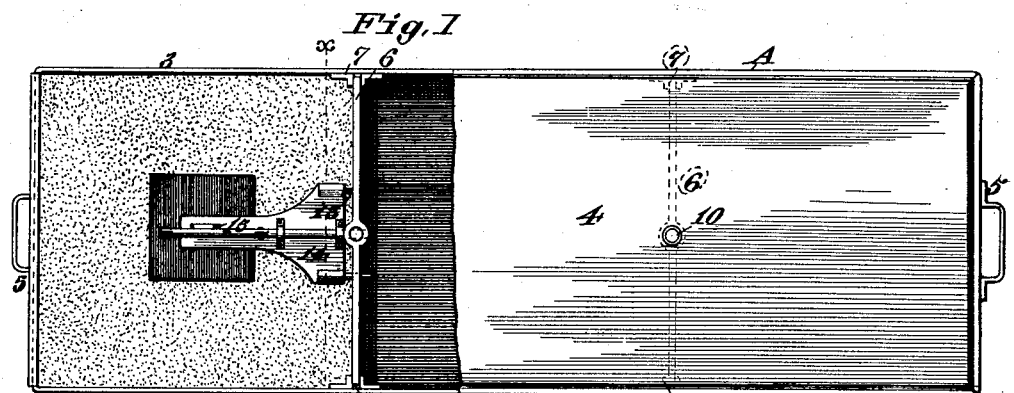
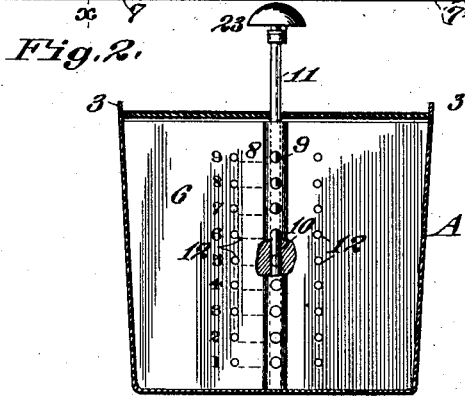
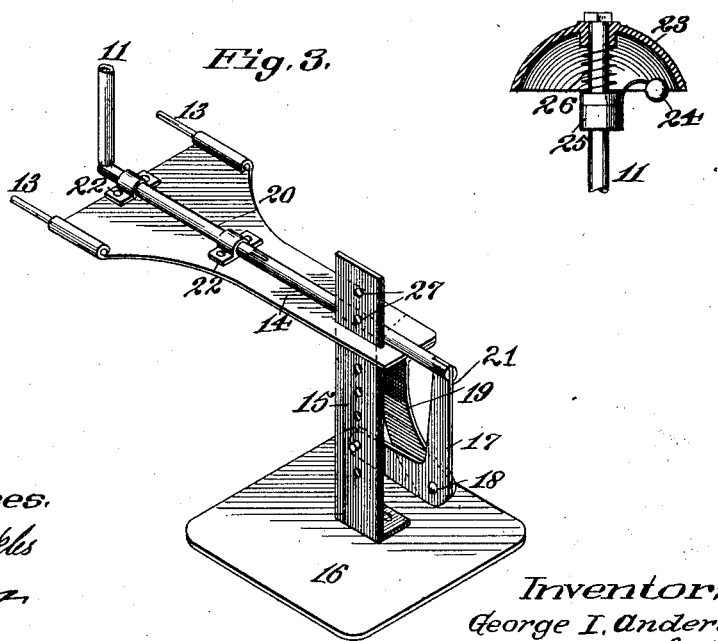
Witnesses,
Charles Pickles
R. S. Burry
Inventor,
George I. Andersen
By G. H. Strong, atty

UNITED STATES PATENT OFFICE.

GEORGE I. ANDERSEN, OF SAN FRANCISCO, CALIFORNIA.

DEVICE FOR DENOTING EXPANSION OF DOUGH.

1,037,714.     Specification of Letters Patent.     Patented Sept. 3, 1912.

Application filed February 15, 1911. Serial No. 608,681.

*To all whom it may concern:*

Be it known that I, GEORGE I. ANDERSEN, citizen of the United States, residing in the city and county of San Francisco and State of California, have invented new and useful Improvements in Devices for Denoting Expansion of Dough, of which the following is a specification.

This invention relates to a device for determining when the diastatic agents in bread dough have undergone sufficient fermentation.

In the art of bread making, it is necessary to put the dough or sponge, of which the bread is made, through a rising or fermentation process at different stages while mixing and just prior to baking. This is done by placing the batch of mixed dough in pans or on a molding board and allowing it to stand undisturbed a sufficient length of time for the rising to take place. The length of time necessary for the bread to rise properly depends on temperature, climatic conditions, the quality of the yeast, the character of the flour, etc.; one batch of dough rising in one hour while another batch may require a greater or lesser period of time. If fermentation is allowed to proceed too far, the bread loses materially in nutritive value, as well as in sweetness, delicacy and palatableness. Likewise, if it rises insufficiently the finished bread is not what it ought to be, it being soggy and heavy. It is necessary that the fermenting or rising of the sponge or dough be arrested before it arrives at the exhaustive point; for whenever the dough is allowed to reach its utmost limit of expansion and falls back, or "tumbles in," as it invariably does at this crisis, it loses something of its excellence that no after labor can restore. It is equally essential that the dough rise sufficiently before it is kneaded.

To set every batch of dough to rise in the same length of time is an unsafe criterion for uniformity of product, owing to the fact that different flours contain different proportions of gluten, therefore I have devised a means for determining the proper amount of expansion of a given quantity of dough made of a flour of known proportions of gluten and have constructed a device for indicating the proper moment at which this expansion should be arrested.

It is the object of this invention to provide a simple and practical device by the use of which a baker can accurately determine when a batch of dough is ready for dividing into loaves for baking.

Another object is to provide a device for denoting the expansion of a volume of dough indicating the moment the dough has reached the required extent of expansion.

This invention consists of the parts and the combination and construction of parts as hereinafter more fully described and claimed, having reference to the accompanying drawings, in which—

Figure 1 is a plan view of the invention, as applied. Fig. 2 is a vertical section on the line *x x* with parts broken away. Fig. 3 is a perspective view of the operating mechanism of the device. Fig. 4 is a detail of the alarm bell.

In the drawings A represents a bread mixing pan, or dough receptacle of any suitable construction, preferably in the form of an oblong pan having outwardly flared sides terminating at their upper edges in vertically disposed flanges 3. These flanges 3 extend a short distance above the upper edge of the end portions of the pan A, and act as guides for a cover or lid 4, which snugly fits between the open flanges 3 and is provided with hand-hold extensions 5 on its ends, which project beyond the end portion of the pan A, by which the cover or lid 4 may be lifted up and placed on, or removed from, the dough receptacle A, and when placed in position thereon rests upon the upper edge of the end portion thereof. The pan or receptacle A is designed to be divided into two or more compartments, by means of a movable partition 6 which is adapted to extend crosswise of the interior of the receptacle A and to be retained in a vertical position therein by means of lateral projecting and inwardly extending ribs or flanges 7 formed on, or secured to the inner face of the side walls of the receptacle A.

This construction admits of various sized batches or quantities of dough being set to rise in the one pan; that is to say, when a small quantity of dough is used, a small compartment is provided by placing the partition 6 between the ribs 7, nearest the end of the receptacle A, and placing the dough in the end compartment thus formed. When larger batches of dough are handled, the partition 6 will be moved to another series of stops 7, so as to enlarge the mixing compartment to the desired extent. This partition 6 is provided with a series of graduations represented by a column of spaced horizontal lines 8, this column of graduations extending from the bottom to the top edge of the partition 6 on its inner face. Formed in the partition 6 on each line 8 of the vertical column of graduations are perforations 9 which are located centrally of the partition 6, which open into a vertically disposed bore 10, extending vertically through the partition 6. This bore 10 is designed to receive a loose pin 11, the length of which is slightly greater than the height of the partition so that when the partition 6 is placed within the pan A the pin 11 will normally rest on the bottom of the latter with its upper end projecting through a slot in the cover 4.

Perforations 12 are formed in the partitions 6 on each graduation 8 parallel with the perforations 9 as shown in Fig. 2. The perforations 12 are designed to receive horizontally projecting pins 13 formed on a bracket arm 14 in such manner that when the pins 13 are inserted in the perforations 12, the bracket arm 14 will extend horizontally at right angles to the partitions 6. Slidably mounted and guided in the other end of the bracket arm 14 is a vertically arranged rod 15 on the lower end of which is formed a horizontally disposed plate or shoe 16. The rod 15 is pivotally connected to a short arm of a bell crank lever 17 which is pivoted at 18 to an extension 19 formed on the bracket arm 14. The long arm of the bell crank lever 17 is connected to a reciprocal rod 20 by means of a link 21, the rod 20 being disposed longitudinally upon the bracket arm 14 and supported in suitable guides 22 thereon. The outer end of the rod 20 is adapted to extend into the perforations 9 in the partition 6 and projects across the bore 10 in the path of the pin 11, which is designed to rest upon that portion of the rod extending into the perforation 10.

In the application of the invention, the partition 6 is placed in the desired position in the pan A and after a measured quantity of dough is placed in the pan the bracket arm 14 is attached thereto at the required point on the graduated scale 8. The position of the bracket arm 14 on the partition 6 is governed by the quantity of dough being handled and the grade of the flour from which it is mixed; the graduations 8 being lettered or numbered, or otherwise indexed, to indicate to the baker the necessary position the arm 14 should occupy in order to correspond to the mixture placed in the pan. When in position the rod 20 will extend through a perforation 9 and the shoe 16 will be suspended above the surface of the dough and out of contact therewith. The lid 4 being then placed over the pan A the pin 11 is inserted through a perforation therein so as to extend into the bore 10 and rest upon the rod 20 as before described; the upper end of the pin extending some distance above the cover 4. The dough in the pan on rising to the desired expansion comes in contact with the shoe 16 and moves it upward sufficiently far to rock the lever 17 on its pivot 18 which withdraws the bar 20 from beneath the pin 11, thereby allowing the latter to drop downward in the bore 10.

The purpose of the pin 11 is to provide means for indicating the moment the dough has risen to a certain point, which moment is denoted when the pin 11 drops. As it may not be convenient to watch the pin 11, and to avoid any possibility of its fall passing unnoticed, means are provided for giving an audible alarm, which means are here shown as consisting of a gong or bell 23 mounted on the upper end of the pin 11. This gong is designed to be rung by the fall of the pin 11, the ringing action being accomplished by means of a tapper 24 rigidly mounted on a sleeve 25 slidable on the pin 11. A spiral spring 26 wound on the pin 11 is attached to the sleeve 25 and the pin 11, and is disposed between the sleeve and bell in such manner as to normally retain the tapper 24 out of contact with the gong. When the pin 11 drops, the collar 25 comes in contact with the cover 4 of the pan A or the top of the partition 6 if the cover is left off, thus bringing the tapper 24 to a stop. A continued downward movement of the pin 11 causes the gong 23 to strike the tapper 24 which rings the gong, the spring 26 being compressed by the downward movement of the gong causing the latter to rebound after striking the tapper so that a clear ring will be produced.

The rod 15 carrying the shoe 16 is provided with a series of perforations 27 by means of which it may be adjusted at various points in its length to the lever 17, this adjustment permitting of the shoe 16 being placed in various relations to the bracket arm 14 and the graduated scale 8 according to the grade of flour being used, these perforations being graduated and indexed to correspond with the rising quality of various grades of flour.

By the use of this invention the proper rise of dough is readily ascertained, and guess-work, which has heretofore been largely relied upon, is entirely eliminated, the operation of the device by the rising dough and consequent fall of the pin 11 indicating to the baker that the batch has sufficiently fermented and is ready for further treatment.

Having thus described my invention what I claim and desire to secure by Letters Patent is—

1. In a means for denoting the expansion of dough, a dough receptacle, an adjustable bracket extending over the dough in the receptacle, a graduated support for said bracket, a bell crank lever fulcrumed on said bracket, a contact member dependent therefrom, a trip bar attached to said lever, and a pin adapted to be dropped by the operation of said bar and lever when the latter is rocked by the expansion of the dough.

2. In a means for denoting the expansion of dough, a dough receptacle, an adjustable bracket extending over the dough in the receptacle, a graduated support for said bracket, a bell crank lever fulcrumed on said bracket, a contact member dependent therefrom, a trip bar attached to said lever, a pin adapted to be dropped by the operation of said bar and lever when the latter is rocked by the expansion of the dough, and means by which the dropping of said pin will sound an alarm.

3. In a signal device, the combination of a bracket member having a sliding trigger thereon, a bell crank having a fulcrum support on the bracket with one arm pivoted to the trigger, and a presser plate connected with the other arm of the bell crank, said presser plate having a vertical extension guided in the bracket.

4. In a signal device, the combination of a support having one or more rows of vertically arranged perforations, a bracket adapted to be attached to said support in said perforations, a sliding trigger member on the bracket, a presser plate movable toward and from, the bracket, said presser plate having a vertical extension guided in the bracket, and lever connections between the presser plate and trigger whereby the trigger is reciprocated on the rise and fall of the presser plate.

In testimony whereof I have hereunto set my hand in the presence of two subscribing witnesses.

GEORGE I. ANDERSEN.

Witnesses:
JAMES MASON,
M. V. COLLINS.

---

Copies of this patent may be obtained for five cents each, by addressing the "Commissioner of Patents, Washington, D. C."